(12) United States Patent
Bisheh Niasar et al.

(10) Patent No.: US 12,476,796 B2
(45) Date of Patent: Nov. 18, 2025

(54) CRYPTOGRAPHIC SYSTEM REAL-TIME TEST VECTOR LEAKAGE ASSESSMENT

(71) Applicant: Microsoft Technology Licensing, LLC, Redmond, WA (US)

(72) Inventors: Mojtaba Bisheh Niasar, Ithaca, NY (US); Bharat S. Pillilli, El Dorado Hills, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 109 days.

(21) Appl. No.: 18/433,869

(22) Filed: Feb. 6, 2024

(65) Prior Publication Data

US 2025/0254027 A1    Aug. 7, 2025

(51) Int. Cl.
*H04L 9/08* (2006.01)
*H04L 9/30* (2006.01)

(52) U.S. Cl.
CPC .......... *H04L 9/0825* (2013.01); *H04L 9/3066* (2013.01)

(58) Field of Classification Search
CPC ........ H04L 9/0825; H04L 9/3066; H04L 9/08
See application file for complete search history.

(56) References Cited

U.S. PATENT DOCUMENTS 8,032,473 B2 * 10/2011 Rice .................. G06F 18/24155
706/46
2019/0318130 A1 * 10/2019 Ghosh ..................... H04L 9/003

OTHER PUBLICATIONS

TVLA assessment and prevention by Florian Bache (Year: 2021).*

* cited by examiner

*Primary Examiner* — Quazi Farooqui
(74) *Attorney, Agent, or Firm* — Schwegman Lundberg & Woessner, P.A.

(57) ABSTRACT

Test inputs are iteratively provided to a target asymmetric cryptographic system. Trace information resulting from operation of the cryptographic system is received corresponding to processing each test input. For each test input, test vector leakage assessment (TVLA) is performed on the trace information for the test input, t-values are stored, and the trace information is erased before proceeding to a next test input. In one example, a mean and variance of the trace information is updated for each test input.

20 Claims, 6 Drawing Sheets

CRYPTOGRAPHIC SYSTEM REAL-TIME TEST VECTOR LEAKAGE ASSESSMENT

BACKGROUND

Cryptographic algorithms are used to build cryptographic protocols for computer security systems. Example cryptographic algorithms, referred to as primitives, include one-way hash functions and encryption functions used to generate keys and signatures. Cryptographic primitives are often vulnerable to side-channel analysis (SCA), which can reveal secret information by observing and analyzing electrical signals of hardware used to implement the primitives.

To protect against SCA, both the algorithm and the hardware implementation should be carefully designed. Test vector leakage assessment (TVLA) provides a robust test using a t-test to evaluate the differences between sets of measurements to determine if one set of measurements can be distinguished from another. TVLA can detect various kinds of leakages and provide a clear indication of whether the implementation is secure or not.

TVLA can be challenging to perform, especially for asymmetric crypto systems such as elliptic curve cryptography (ECC), which have high latency and require many traces to achieve a high confidence level.

SUMMARY

Test inputs are iteratively provided to a target asymmetric cryptographic system. Trace information resulting from operation of the cryptographic system is received corresponding to processing each test input. For each test input, test vector leakage assessment (TVLA) is performed on the trace information for the test input, t-values are stored, and the trace information is erased before proceeding to a next test input. In one example, a mean and variance of the trace information is updated for each test input.

DETAILED DESCRIPTION

Figure 1:
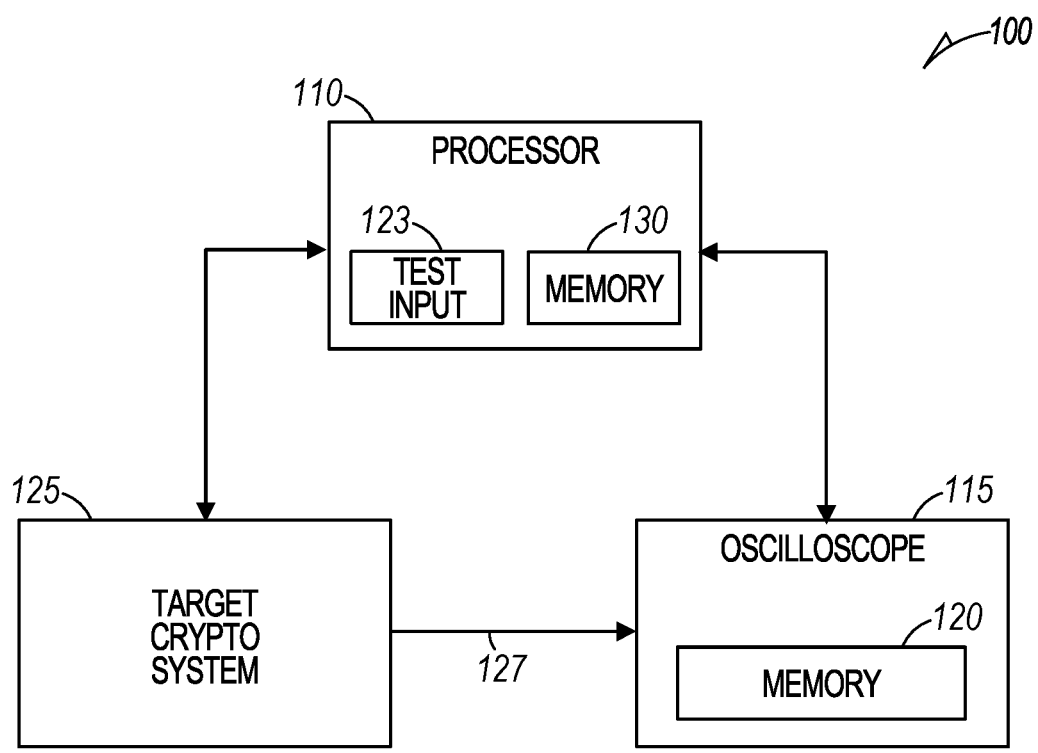
FIG. 1 is a block diagram of an improved test system to performs TVLA on high latency cryptography systems according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Test Vector Leakage Assessment (TVLA) is a method to robustly and efficiently detect signal leakage that a passive attacker may be able to observe during cryptographic operations. The term TVLA is used herein to refer to calculations and methods used in assessing leakage derivable from test vectors collected from observing the performance of a cryptographic system. Leakage refers to any observable hardware emissions, such as power consumption or electromagnetic emissions that may be measured during execution of the operations that can provide information from which a secret value may be determined. Use of such measurements to determine the secret value may be referred to as side channel analysis (SCA.)

Two different sets of test input data may be collected and used to perform TVLA. One test input is a constant input, such as all zeros or all ones that may be processed with emissions measured. A second set of test input data may comprise random or varied input. Data collected from these two sets input result in two sets of traces each having $n_1$ and $n_2$ traces, which each trace including a large number of samples. In one example each trace includes 7.5 million samples. Each sample in one example includes twelve bits of data used to represent the measured emission. Corresponding respective sample means, $\overline{x_1}$ and $\overline{x_2}$, and respective sample standard deviations, $\sigma_1$ and $\sigma_2$ are calculated for the respective traces $n_1$ and $n_2$.

To perform TVLA to determine whether leakage is occurring, a t-statistic using a t-test (a statistical test that compares the means of two samples) can be computed to generate a t-value:

$$\alpha = \frac{\overline{x_1} - \overline{x_2}}{\sqrt{\frac{\sigma_1^2}{n_1} + \frac{\sigma_2^2}{n_2}}}$$

In practice, observing a t-value, $\alpha$, greater than a specific threshold indicates the presence of leakage. The confidence threshold is typically set to 4.5. However, a TVLA threshold should be considered as a function of the number of samples per trace. Some leakage points may exceed the threshold.

To perform TVLA, side-channel information of the hardware, such as power or electromagnetic traces, is captured using a high-resolution oscilloscope or electromagnetic (EM) probe during processing of test input. For an asymmetric crypto system such as ECC, side channel information is challenging to capture since such systems have a high latency even on hardware accelerators.

For example, ECC Secp384r1 in a hardware accelerator takes around 1,000,000 cycles to compute a signature, and Curve448 takes around 4,000,000 cycles on an ARM Cortex M4. To have an accurate TVLA, at least 5 samples per each cycle is required for each trace. These 5 samples result in a huge number of samples per captured trace. Assuming 12-bit resolution for each sample, each trace would be greater than 7.2 MB and 28.6 MB for Secp384r1 and Curve448 respectively.

Many traces may be required to be captured to achieve a high confidence level. For example, more than 100,000 or 1,000,000 traces may be captured to ensure there is no leakage of information during computations. For short latency crypto computation (such as advanced encryption standard (AES) or secure hash algorithm (SHA) with less than 100 cycles), researchers typically capture all the traces and perform TVLA after that. However, such a process would not work for the ECC due to its long latency.

An improved test system provides a fast and reliable way to test the SCA resistance of ECC and other asymmetric crypto systems, which are widely used in modern cryptography. Other solutions typically capture all the traces and perform TVLA after that, which can be impractical for high-latency crypto systems such as ECC. The improved system performs real-time TVLA after each trace, avoiding the problems of storing and processing large amounts of data that would otherwise hinder the TVLA analysis.

FIG. 1 is a block diagram of an improved test system 100. Test system 100 includes a processor 110 that performs TVLA on ECC and other high latency cryptography systems. Processor 110 processes captured traces in real-time and avoids storage/processing problems. The improved test system 100 includes a high-resolution oscilloscope 115 that has enough memory 120 to store at least one trace. The oscilloscope 115 may be embedded into an interpreter-based environment, such as a Python environment. Processor 110 provides test input 123 as input to a target cryptographic system 125. The test input 123 includes two different types of sets that are processed one set at a time, with one set including a constant, and the other set variable. In one example, the type of set to be processed is selected randomly. Oscilloscope 115 captures first trace data 127 from the cryptographic system 125 execution of a first test input during a first iteration.

The first trace data that is captured during a first iteration of data collection is stored in memory 120. Memory 120 may be a buffer in oscilloscope 115 that can store all of the first trace data for batch transfer following completion of collection of the first trace data. The memory 120 may operate to transfer trace data to processor 110 for storage in processor memory 130 during capture of the first trace data.

The captured first trace data is then processed by processor 110, and a minimum required amount of information is retained in processor memory 130 from the first iteration to perform TVLA as more trace data is collected from further iterations. The captured first trace data from the first iteration is then erased to avoid having to store large amounts of data before capturing trace data from subsequent iterations.

Figure 2:
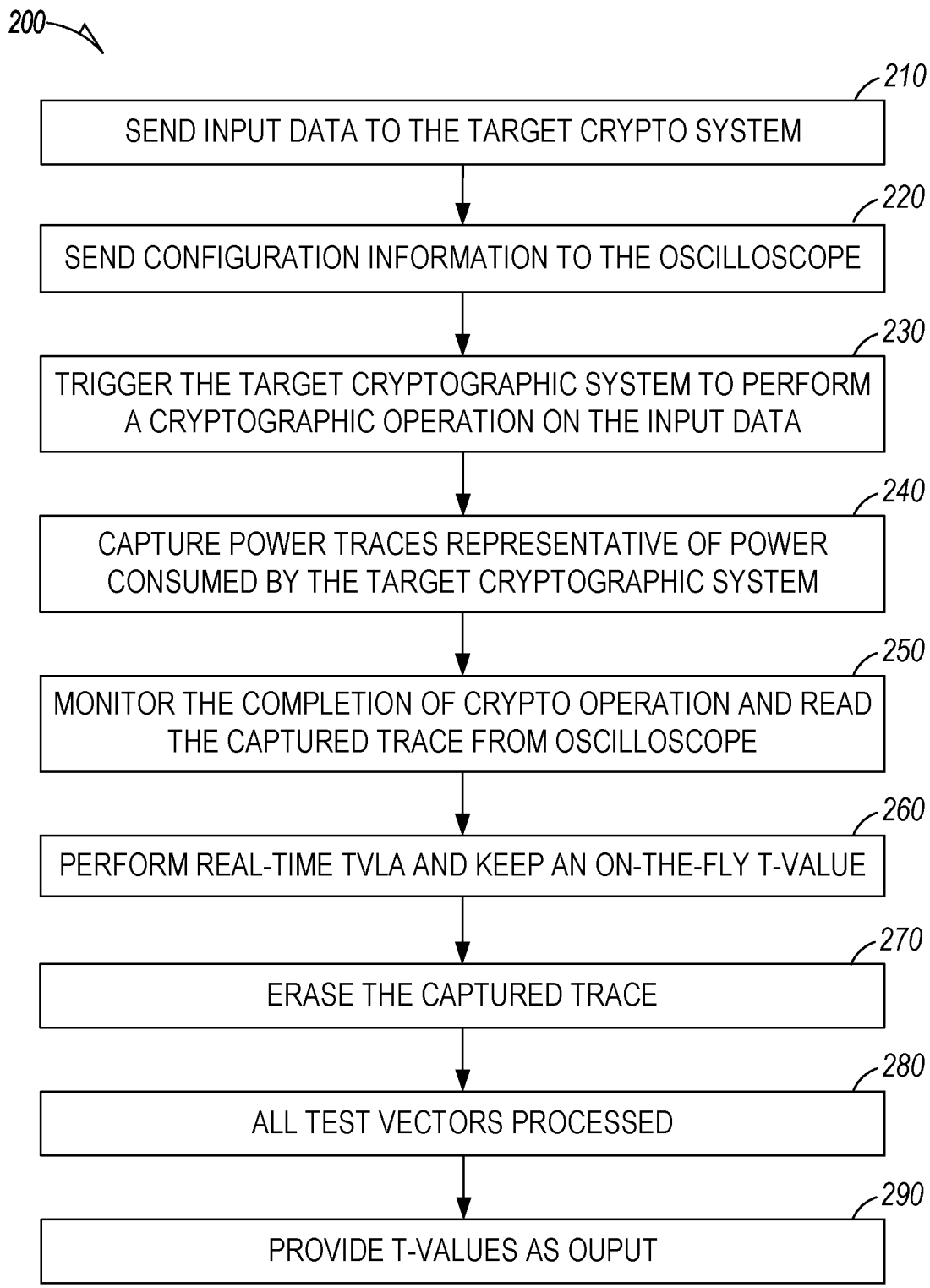
FIG. 2 is a flowchart illustrating a method of performing TVLA by test system according to an example embodiment.

FIG. 2 is a flowchart illustrating a method 200 of performing TVLA by test system 100. Method 200 begins at operation 210 by sending the required input data from processor 110 to the target crypto system 125. Configuration information is sent from the processor 110 to the oscilloscope 115 at operation 220 to properly set up the number and timing of samples collected from each cycle of the of the target crypto system 125. In one example, at least five samples are collected per cycle of the target crypto system 125.

At operation 230, the processor 101 triggers the target cryptographic system 125 to perform a cryptographic operation on the input data. The oscilloscope 115 in operation 240 captures trace information, such as power traces representative of power consumed by the target cryptographic system 125 during performance of the cryptographic operation. While power consumption is utilized for this example, any other type of emission or measurable parameter that may provide data sufficient for SCA attack may be captured in further examples.

In operation 250, the processor 110 monitors the completion of crypto operation and reads the captured trace from oscilloscope 115. Processor 110 performs real-time TVLA at operation 260 and keeps an on-the-fly t-value. The captured trace is erased at operation 270. Operation 280 checks to determine if all input data test vectors have been processed. If no, method 200 returns to operation 210 to process the next test vector resulting in many iterations. If yes, method 200 has iterated over all the test vectors and a required number of captured traces have been processed. At operation 290, the t-values are provided as output or stored for later analysis.

Figure 3:
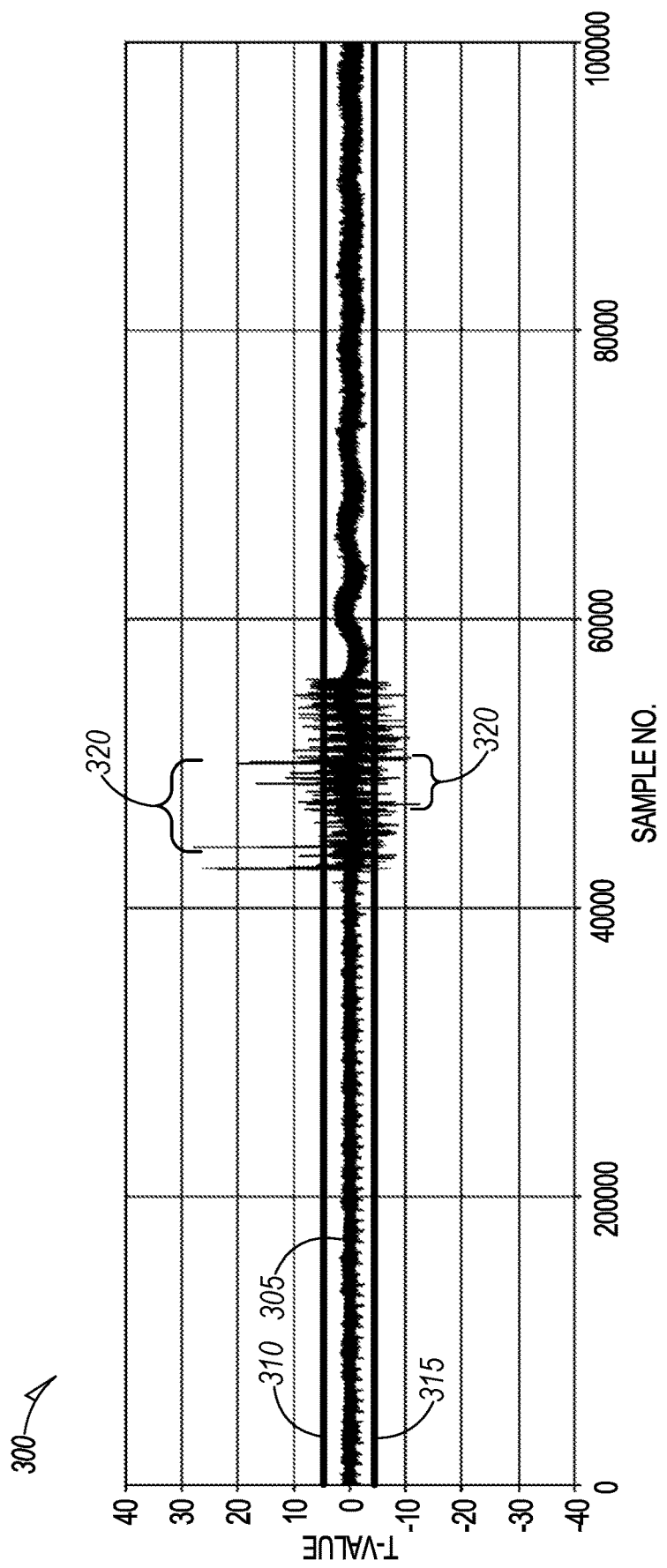
FIG. 3 is a graph illustrating t-values calculated over 100,000 samples according to an example embodiment.

FIG. 3 is a graph 300 illustrating t-values 305 calculated over 100,000 samples. A t-value threshold of 4.5 is shown at bolded lines 310 and 315. Several spikes are illustrated at 320 as exceeding the t-value thresholds, meaning that leakage occurred. Such leakage is evidence that SCA may be used on corresponding cryptography hardware from which the samples were collected. Given such leakage, countermeasures should be employed to minimize or eliminate the leakage.

Real-time computation of TVLA may be performed in the following manner. In each iteration, a value of $\bar{x}_i$ is updated based on the number of captured traces for that category. $n_i$ and $\bar{x}_i$ are tracked in each k-th iteration as follows:

$$n_i^k = n_i^{k-1} + 1$$

$$\bar{x}_i^k = \bar{x}_i^{k-1} + \frac{\text{trace} - \bar{x}_i^{k-1}}{n_i^k}$$

To update the variance, $\alpha$, in k-th iteration:

$$\sigma_i^{2,k} = \frac{n_i^{k-1} \sigma_i^{2,k-1}}{n_i^k} + (\text{trace} - \bar{x}_i^{k-1})^2 \times \frac{n_i^{k-1}}{n_i^{2,k}}$$

Six different values are stored following each iteration to provide on-the-fly computation of TVLA. Note that n is an integer, and x and the variance are a vector having a length of the total sample.

From performance point of view, method 200 to perform TVLA on a target system comprising ECC Secp384r1 with 7.8 sample pre cycle was performed. The total number of samples per trace was around 7,500,000. 1,000,000 iterations were performed to evaluate the target system. The average processing time for each iteration was around 320 ms, while the target crypto system itself took around 100 ms to perform one operation at 10 MHz clock frequency. Hence, all the interface and processing took around 220 ms.

Figure 4:
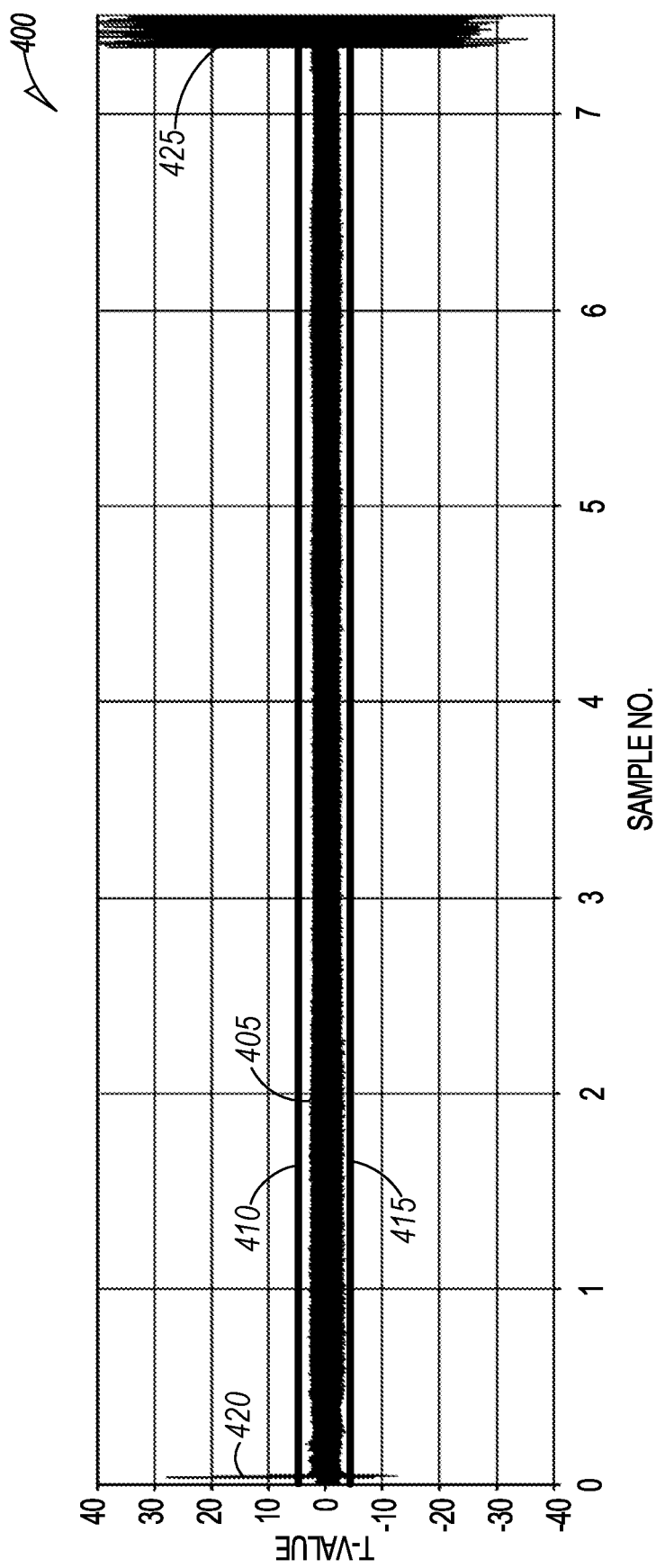
FIG. 4 is a graph illustrating t-values calculated over 7.8 samples per cryptographic system cycle for one million test inputs with no leakage points corresponding to the t-value exceeding a threshold according to an example embodiment.

FIG. 4 is a graph 400 illustrating t-values 405 calculated over the samples. A t-value threshold of 4.5 is shown at bolded lines 410 and 415. Graph 400 may be provided as output at operation 290, or the t-values may be provided in digital format for further processing and analysis. Graph 400 also shows samples exceeding the threshold at a beginning 420 and an ending 425 of the samples. Between such beginning 420 and ending 425, countermeasures were employed, resulting in no t-values exceeding the threshold during the use of the countermeasures.

Figure 5:
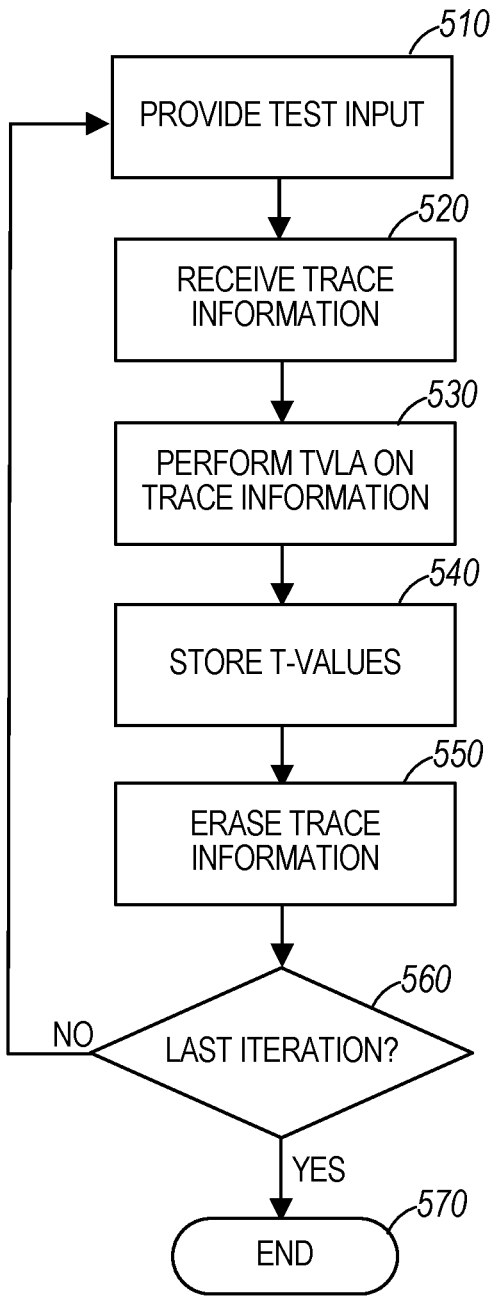
FIG. 5 is a flowchart illustrating a method of performing TVLA on test vectors collected from operation of a target asymmetric cryptographic system according to an example embodiment.

FIG. 5 is a flowchart illustrating a method 500 of performing TVLA on test vectors collected from a target asymmetric cryptographic system. Method 500 begins at operation 510 by iteratively providing test input to the target asymmetric cryptographic system. In one example the cryptographic system comprises an ECC based cryptographic system.

Trace information resulting from operation of the cryptographic system is successively received at operation 520 corresponding to processing each test input. For each test input, operation 530 performs TVLA on the trace information for the test input, operation 540 stores t-values generated from the TVLA. Operation 550 erases the trace information, while the t-values are retained. Operation 560 determines whether or not all iterations have been performed, corresponding to all the test input being processed. If not, operation returns to 510. If yes, method 500 ends at 570, and TVLA information is provided in a desired format.

In one example, performing TVLA on the trace information comprises updating a mean of the trace information and updating a variance of the trace information. Trace information in one example is received from an oscilloscope coupled to measure power consumed by the cryptographic system.

Configuration information may be sent to the oscilloscope prior to receiving the trace information in order to collect a desired number of samples per cycle of the cryptographic system. The cryptographic system is triggered following the sending the configuration information.

The test input may include two sets of input data such as a constant set of test input data and a varied set of test input data. The varied set of test input data may be random input data. The t-values comprise a mean, variance, and iteration number for of the trace information for each set of input data.

Figure 6:
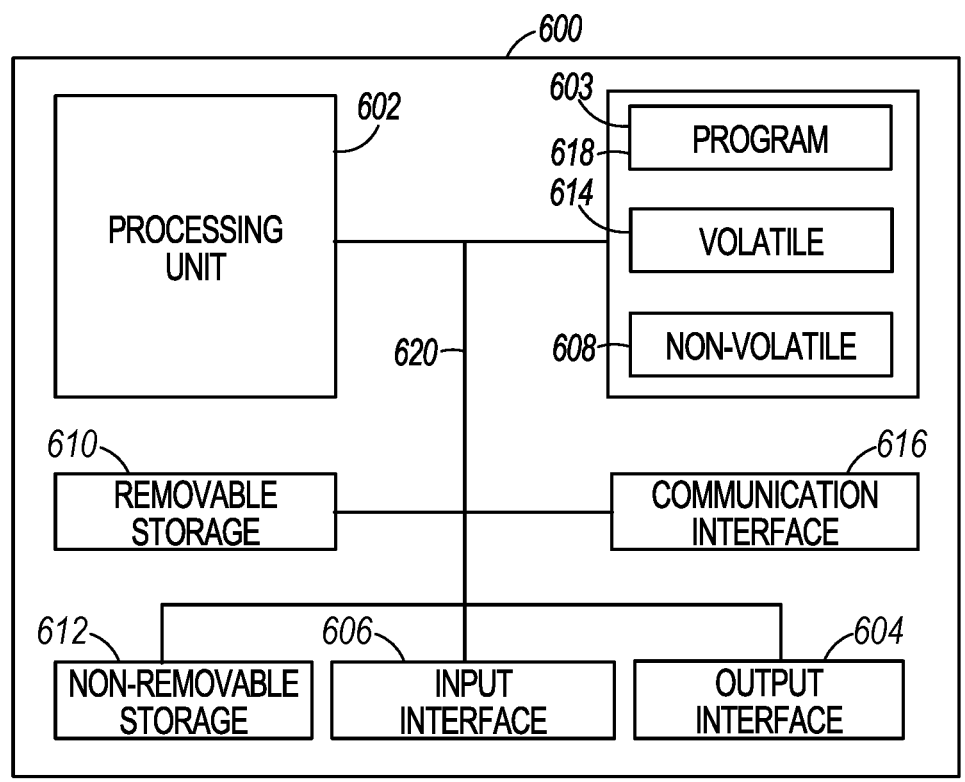
FIG. 6 is a block schematic diagram of a computer system to implement one or more example embodiments.

FIG. 6 is a block schematic diagram of a computer system 600 to implement one or more components of system 100, including processor 110, target cryptography system 125, and oscilloscope 115 for performing TVLA and for performing other methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A method includes iteratively providing test input to a target asymmetric cryptographic system, successively receiving trace information resulting from operation of the cryptographic system corresponding to processing each test input, and for each test input, performing test vector leakage assessment (TVLA) on the trace information for the test input, storing t-values, and erasing the trace information before proceeding to a next test input.

2. The method of example 1 and further including, for each test input, updating a mean of the trace information and updating a variance of the trace information.

3 The method of any of examples 1-2 wherein the trace information is received from an oscilloscope coupled to measure power consumed by the cryptographic system.

4. The method of example 3 and further including sending configuration information to the oscilloscope prior to receiving the trace information.

5. The method of example 4 and further including triggering the cryptographic system following sending the configuration information.

6. The method of any of examples 1-5 wherein the cryptographic system includes an elliptic curve cryptography (ECC) based cryptographic system.

7. The method of any of examples 1-6 wherein the test input includes two sets of input data.

8. The method of example 7 wherein the two sets of input data include a constant set of test input data and a varied set of test input data.

9. The method of example 8 wherein the varied set of test input data includes random input data.

10. The method of any of examples 8-9 wherein the t-values include a mean, variance, and iteration number for of the trace information for each set of input data.

11. A machine-readable storage device has instructions for execution by a processor of a machine to cause the processor to perform operations to perform any of the methods of examples 1-10.

12. A device includes a processor and a memory device coupled to the processor and having a program stored thereon for execution by the processor to perform operations to perform any of the methods of examples 1-10.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
    iteratively providing test input to a target asymmetric cryptographic system;
    successively receiving trace information resulting from operation of the cryptographic system corresponding to processing each test input; and
    for each test input:
        performing test vector leakage assessment (TVLA) on the trace information for the test input;
        storing t-values; and
        erasing the trace information before proceeding to a next test input.

2. The method of claim 1 and further comprising for each test input:
    updating a mean of the trace information; and
    updating a variance of the trace information.

3. The method of claim 1 wherein the trace information is received from an oscilloscope coupled to measure power consumed by the cryptographic system.

4. The method of claim 3 and further comprising sending configuration information to the oscilloscope prior to receiving the trace information.

5. The method of claim 4 and further comprising triggering the cryptographic system following sending the configuration information.

6. The method of claim 1 wherein the cryptographic system comprises an elliptic curve cryptography (ECC) based cryptographic system.

7. The method of claim 1 wherein the test input comprises two sets of input data.

8. The method of claim 7 wherein the two sets of input data comprise a constant set of test input data and a varied set of test input data.

9. The method of claim 8 wherein the varied set of test input data comprises random input data.

10. The method of claim 8 wherein the t-values comprise a mean, variance, and iteration number for of the trace information for each set of input data.

11. A machine-readable storage device having instructions for execution by a processor of a machine to cause the processor to perform operations to perform a method, the operations comprising:
    iteratively providing test input to a target asymmetric cryptographic system;
    successively receiving trace information resulting from operation of the cryptographic system corresponding to processing each test input; and
    for each test input:
        performing test vector leakage assessment (TVLA) on the trace information for the test input;
        storing t-values; and erasing the trace information before proceeding to a next test input.

12. The device of claim 11 wherein the operations further comprise:
updating a mean of the trace information; and
updating a variance of the trace information.

13. The device of claim 11 wherein the trace information is received from an oscilloscope coupled to measure power consumed by the cryptographic system, and wherein the operations further comprise:
sending configuration information to the oscilloscope prior to receiving the trace information; and
triggering the cryptographic system following sending the configuration information.

14. The device of claim 11 wherein the cryptographic system comprises an elliptic curve cryptography (ECC) based cryptographic system.

15. The device of claim 11 wherein the test input comprises two sets of input data comprising a constant set of test input data and a varied set of test input data.

16. The device of claim 15 wherein the varied set of test input data comprises random input data and wherein the t-values comprise a mean, variance, and iteration number for of the trace information for each set of input data.

17. A device comprising:
a processor; and
a memory device coupled to the processor and having a program stored thereon for execution by the processor to perform operations comprising:
iteratively providing test input to a target asymmetric cryptographic system;
successively receiving trace information resulting from operation of the cryptographic system corresponding to processing each test input; and
for each test input:
performing test vector leakage assessment (TVLA) on the trace information for the test input;
storing t-values; and
erasing the trace information before proceeding to a next test input.

18. The device of claim 17 wherein the operations further comprise:
updating a mean of the trace information; and
updating a variance of the trace information.

19. The device of claim 17 wherein the trace information is received from an oscilloscope coupled to measure power consumed by the cryptographic system, and wherein the operations further comprise:
sending configuration information to the oscilloscope prior to receiving the trace information; and
triggering the cryptographic system following sending the configuration information.

20. The device of claim 17 wherein the cryptographic system comprises an elliptic curve cryptography (ECC) based cryptographic system, wherein the test input comprises two sets of input data comprising a constant set of test input data and a varied set of test input data, and wherein the t-values comprise a mean, variance, and iteration number for of the trace information for each set of input data.

* * * * *